US010266047B2

(12) United States Patent
Sakurada et al.

(10) Patent No.: US 10,266,047 B2
(45) Date of Patent: Apr. 23, 2019

(54) VALVE PROTECTION STRUCTURE FOR VEHICLE (71) Applicant: HONDA MOTOR CO., LTD., Tokyo (JP)

(72) Inventors: Chihiro Sakurada, Wako (JP); Isao Saito, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 198 days.

(21) Appl. No.: 15/295,267

(22) Filed: Oct. 17, 2016

(65) Prior Publication Data
US 2017/0113540 A1    Apr. 27, 2017

(30) Foreign Application Priority Data

Oct. 22, 2015   (JP) .................................. 2015-208437

(51) Int. Cl.
*B60K 15/03*    (2006.01)
(52) U.S. Cl.
CPC .................. *B60K 15/03006* (2013.01); *B60K 2015/03026* (2013.01)
(58) Field of Classification Search
CPC ............... B60K 15/03006; B60K 2015/03026
USPC ....................................................... 280/834
See application file for complete search history.

(56) References Cited

U.S. PATENT DOCUMENTS

| 4,098,520 | A | * | 7/1978 | Ezaki | ..................... | B60K 15/00 280/784 |
| 4,930,811 | A | * | 6/1990 | Tsukada | ........... | B60K 15/03177 180/69.4 |
| 5,547,224 | A | * | 8/1996 | Kami | ................... | B60K 15/073 280/781 |
| 8,083,263 | B2 | * | 12/2011 | Yamanami | ............. | B60K 15/07 280/830 |
| 2011/0127761 | A1 | * | 6/2011 | Yoshizawa | ....... | B60K 15/03177 280/834 |
| 2014/0191498 | A1 | * | 7/2014 | Shipp | ................... | B60K 15/067 280/834 |
| 2016/0200191 | A1 | * | 7/2016 | Ito | ........................ | B60K 15/073 280/834 |

FOREIGN PATENT DOCUMENTS

JP    2010-18266 A    1/2010

* cited by examiner

*Primary Examiner* — Tony H Winner
(74) *Attorney, Agent, or Firm* — Westerman, Hattori, Daniels & Adrian, LLP (57) ABSTRACT A valve protection structure for a vehicle includes: side members; a hydrogen tank disposed between the side members; and a valve member installed to project from a vehicle-widthwise end face of the hydrogen tank. The side member has a convex member projecting inward in the vehicle widthwise direction from an inner wall part, the convex member is placed at a position offset with respect to the valve member and opposite the hydrogen tank in the vehicle widthwise direction, and a vehicle-widthwise distance between a tip part of the convex member and a portion of the hydrogen tank opposite the tip part of the convex member in the vehicle widthwise direction is set shorter than a vehicle-widthwise distance between a tip part of the valve member and a portion of the side member opposite the tip part of the valve member in the vehicle widthwise direction.

12 Claims, 5 Drawing Sheets

VALVE PROTECTION STRUCTURE FOR VEHICLE

CROSS REFERENCES TO RELATED APPLICATIONS

The present application claims priority under 35 U.S.C. § 119 to Japanese Patent Application No. 2015-208437, filed Oct. 22, 2015, entitled "Valve Protection Structure for Vehicle." The contents of this application are incorporated herein by reference in their entirety.

TECHNICAL FIELD

The present disclosure relates to a valve protection structure for a vehicle, and specifically relates to a structure for protecting a valve installed on a fuel tank of a vehicle.

BACKGROUND

Heretofore, there has been known a technique for protecting a fuel tank of a vehicle against a load in the event of a collision from in front of or behind a vehicle (see Japanese Patent Application Publication No. 2010-018266).

SUMMARY

However, the technique described in Japanese Patent Application Publication No. 2010-018266 is designed to protect a fuel tank against a load caused by a collision from the front or rear, and does not take into consideration of a load caused by a collision from the side (side collision) of a vehicle. In particular, in a structure provided with a valve on a vehicle-widthwise end face of the fuel tank, a side collision load caused at the time of a side collision of the vehicle might be applied on the valve. Thus, the protection of the valve against the side collision load has been requested.

In view of the foregoing point, the present disclosure provides, for example, a valve protection structure for a vehicle capable of protecting a valve installed on a vehicle-widthwise end face of a fuel tank in the event of a side collision of a vehicle.

In order to solve the above problem, a valve protection structure for a vehicle according to the first aspect is characterized by including: a pair of left and right side members which extend in a longitudinal direction with respect to a vehicle body; a fuel tank which is disposed between the paired left and right side members; and a valve which is installed to project outward in a vehicle widthwise direction from a vehicle-widthwise end face of the fuel tank, the structure being characterized in that one of the side members located on a side close to the valve has a convex part, that projects inward in the vehicle widthwise direction from a vehicle-widthwise inner side face of the side member, the convex part is placed at a position offset with respect to the valve and opposite the vehicle-widthwise end face of the fuel tank in the vehicle widthwise direction, and a vehicle-widthwise distance between a tip part of the convex part and a portion of the fuel tank opposite the tip part of the convex part in the vehicle widthwise direction is set shorter than a vehicle-widthwise distance between a tip part of the valve and a portion of the side member opposite the tip part of the valve in the vehicle widthwise direction.

According to this configuration, since the side member has the convex part, it is possible to protect the valve installed on the vehicle-widthwise side face of the fuel tank in the event of a side collision of a vehicle.

The structure may be configured such that the convex part is constituted of a convex member attached to the side member, and a lower part of the convex member extends to a bottom face of the side member and is attached to the bottom face.

According to this configuration, since the convex part is constituted of the convex member being a member different from the side member and the lower part of the convex member is joined to the bottom face of the side member, it is possible to enhance the strength of the convex part and thereby protect the valve member against side collision more favorably.

The structure may be configured such that the convex part has a slit extending in the vehicle widthwise direction.

According to this configuration, since the convex part (convex member) has a slit, the convex part is likely to crash in the direction toward the vehicle when an excessive load is applied on the convex part, enabling absorption of energy caused by a side collision.

The structure may be configured such that the fuel tank includes: a fuel tank body which is capable of storing fuel therein; and a tank cover which is installed on a vehicle-widthwise end part of the fuel tank body and on which the valve is mounted, and the tank cover has a projection part that projects outward in the vehicle widthwise direction from a vehicle-widthwise end face of the tank cover at a position opposite the convex part in the vehicle widthwise direction.

According to this configuration, since the tank cover has the projection part, projecting from the vehicle-widthwise end face of the tank cover, at a position opposite the convex part (convex member) in the vehicle widthwise direction, it is possible to set the distance between the convex part (convex member) and the fuel tank suitably by means of the projection height of the projection part.

Meanwhile, a valve protection structure for a vehicle according to another aspect is characterized by including a pair of left and right side members which extend in a longitudinal direction with respect to a vehicle body; a fuel tank which is disposed between the paired left and right side members; and a valve which is installed to project outward in a vehicle widthwise direction from a vehicle-widthwise end face of the fuel tank, the structure being characterized in that one of the side members located on a side close to the valve has a convex part that projects inward in the vehicle widthwise direction from a vehicle-widthwise inner side face of the side member, the convex part is placed at a position offset with respect to the valve and opposite the vehicle-widthwise end face of the fuel tank in the vehicle widthwise direction, and a portion of the side member on the valve side, which is located at the same position as the valve in the longitudinal direction with respect to a vehicle, is offset upward with respect to the valve.

According to the present disclosure, for example, it is possible to protect a valve installed on a vehicle-widthwise side face of a fuel tank in the event of a side collision of a vehicle.

BRIEF DESCRIPTION OF THE DRAWINGS

The advantages of the disclosure will become apparent in the following description taken, in conjunction with the following drawings.

FIGS. 5(a) and 5(b) are perspective views illustrating a convex member, in which

DETAILED DESCRIPTION

A detailed description is given of an embodiment of the present disclosure with reference to the drawings while taking, as an example, a case where an embodiment of a valve protection structure for a vehicle according to the present disclosure is applied to the periphery of a hydrogen tank which is a fuel tank of a fuel cell vehicle using hydrogen as a fuel. Throughout the description, the same constituents are given the same reference numerals, and the redundant description thereof is omitted. Note that, the "front and rear", "up and down", and "left and right" illustrated by the arrows in each drawing respectively indicate a longitudinal direction with respect to a vehicle body, a vertical direction with respect to the vehicle body, and a lateral direction (vehicle widthwise direction) as seen from a driver's seat.

<Valve Protection Structure for Vehicle>

Figure 1:
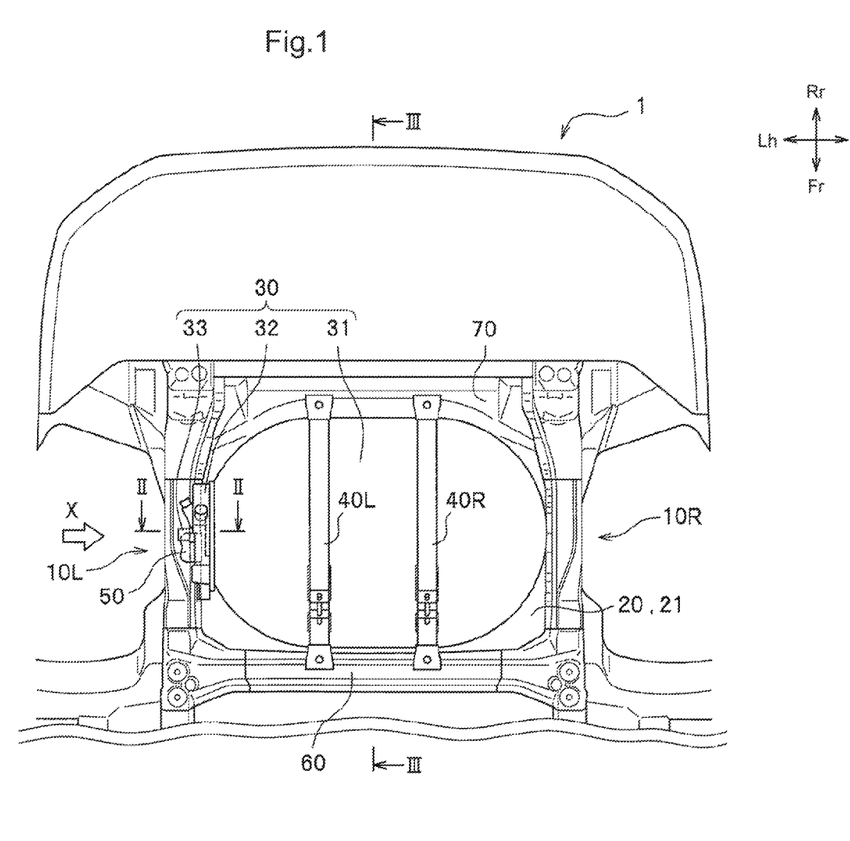
FIG. 1 is a bottom view illustrating a valve protection structure for a vehicle according to an embodiment of the present disclosure.

As illustrated in FIG. 1, a valve protection structure for a vehicle 1 according to the embodiment of the present disclosure is a structure for protecting a valve member 33 installed in a hydrogen tank 30 against side collision, and includes: a pair of left and right side members 10L, 10R; a floor panel 20; the hydrogen tank 30; support, members 40L, 40R; and a convex member 50. In the vehicle, i.e., the fuel cell vehicle according to this embodiment, the pair of left and right side members 10L, 10R and the floor panel 20 are formed by longitudinally combining multiple members obtained by division; in this embodiment, a description is provided for a structure of these parts in a portion near left and right rear wheels (not illustrated) of the vehicle where the hydrogen tank 30 is installed.

<Side Member>

The paired left and right side members (also called side frames) 10L, 10R are metallic structural members each extending in the longitudinal direction. For example, the side members 10L, 10R are formed to have a hollow structure by combining rolled steel plates having a U-shape in cross section.

Figure 2:
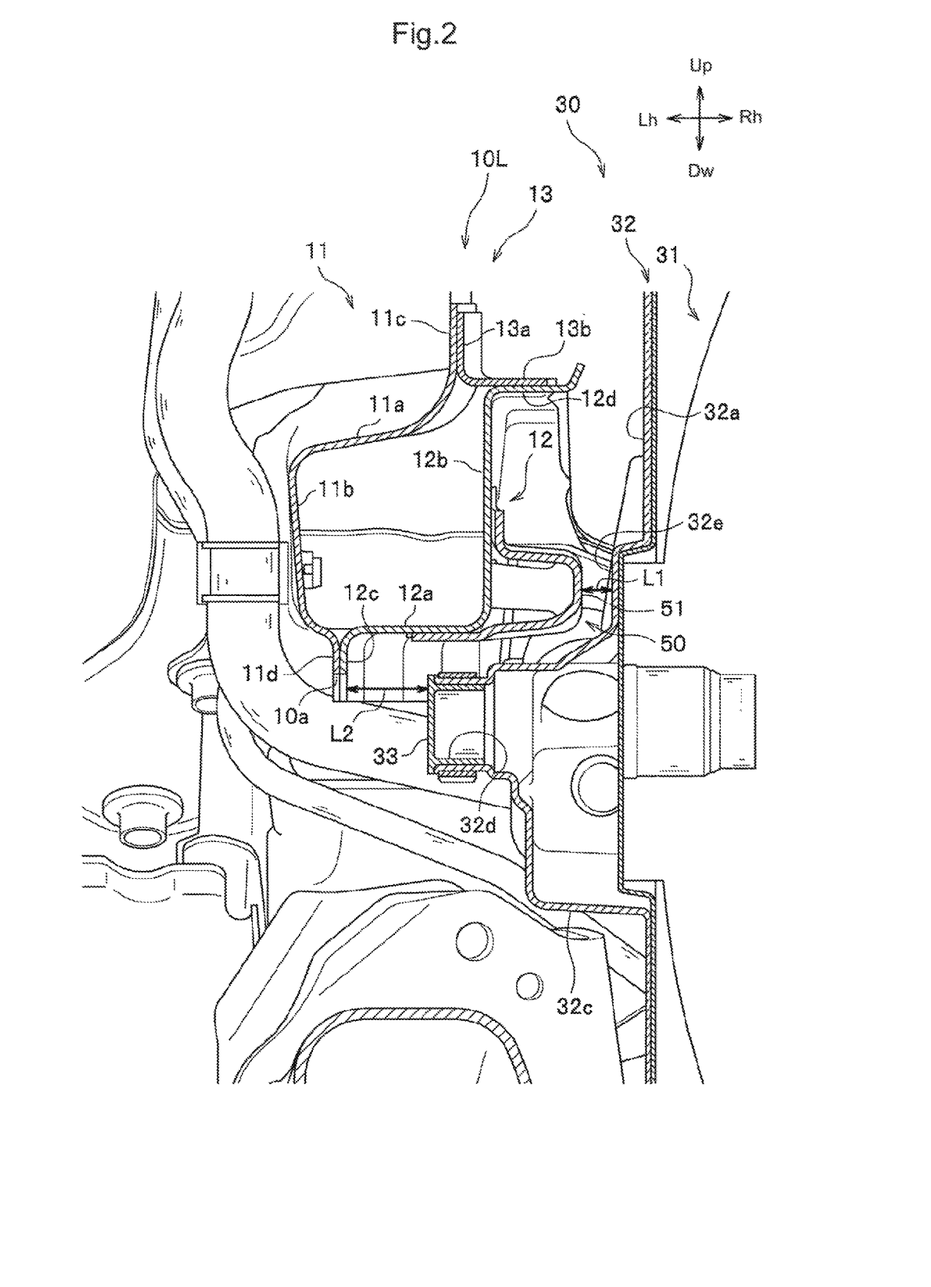
FIG. 2 is a sectional, view seen in the direction of the arrow II-II of FIG. 1.

As illustrated in FIG. 2, a portion of the left side member 10L placed inside the left rear wheel (not illustrated) of the vehicle in the vehicle widthwise direction has the shape of a rectangular frame in a front view, and includes: a side member outer 11; and a side member inner 12.

The side member outer 11 is a metallic member constituting an upper wall part and an outer wall part of the side member 10L. The side member outer 11 integrally includes: an upper wall part 11a; an outer wall part, 11b that extends downward from an outer end part of the upper wall part 11a in the vehicle widthwise direction; a flange part 11c that extends upward from an inner end part of the upper wall part 11a in the vehicle widthwise direction; and a flange part 11d that extends further downward from a lower end part of the outer wall part 11b. The side member outer 11 is produced by subjecting a metallic long plate to bend machining.

The side member inner 12 is a metallic member constituting a lower wall part and an inner wall part of the side member 10L. The side member inner 12 integrally includes: a lower wall part 12a; an inner wall part 12b that extends upward from an inner end part of the lower wall part 12a in the vehicle widthwise direction; a flange part 12c that extends downward from an outer end part of the lower wall part 12a in the vehicle widthwise direction; and a flange part 12d that extends inward from an upper end part of the inner wall part 12b in the vehicle widthwise direction. The side member inner 12 is produced by subjecting a metallic long plate to bend machining.

In this embodiment, the side member outer 11 and the side member inner 12 are joined together at their upper and vehicle-widthwise inner parts via a panel 13 which is a metallic member. The panel 13 is a member placed between the side member 10L and a damper housing (a member where dampers attached to the rear wheels of the vehicle are housed) 80, and integrally includes: a vertical wall part 13a; and a horizontal wall part 13b that extends inward from a lower end part of the vertical wall part 13a in the vehicle widthwise direction.

The flange part 11c of the side member outer 11 is joined to the vertical wall part 13a of the panel 13 by welding or the like. The flange part 11d of the side member outer 11 is joined to the flange part 12c of the side member inner 12 by welding or the like. The flange part 12d of the side member inner 12 is joined to the horizontal wall part 13b of the panel 13 by welding or the like.

In this embodiment, an arc-shaped notch part 10a (see FIG. 3) is formed in the joined flange parts 11d, 12c in a portion opposite the later-described valve member 33 in the vehicle widthwise direction. The notch part 10a is made for the purpose of facilitating the attachment/detachment work of the valve member 33.

<Floor Panel>

Figure 3:
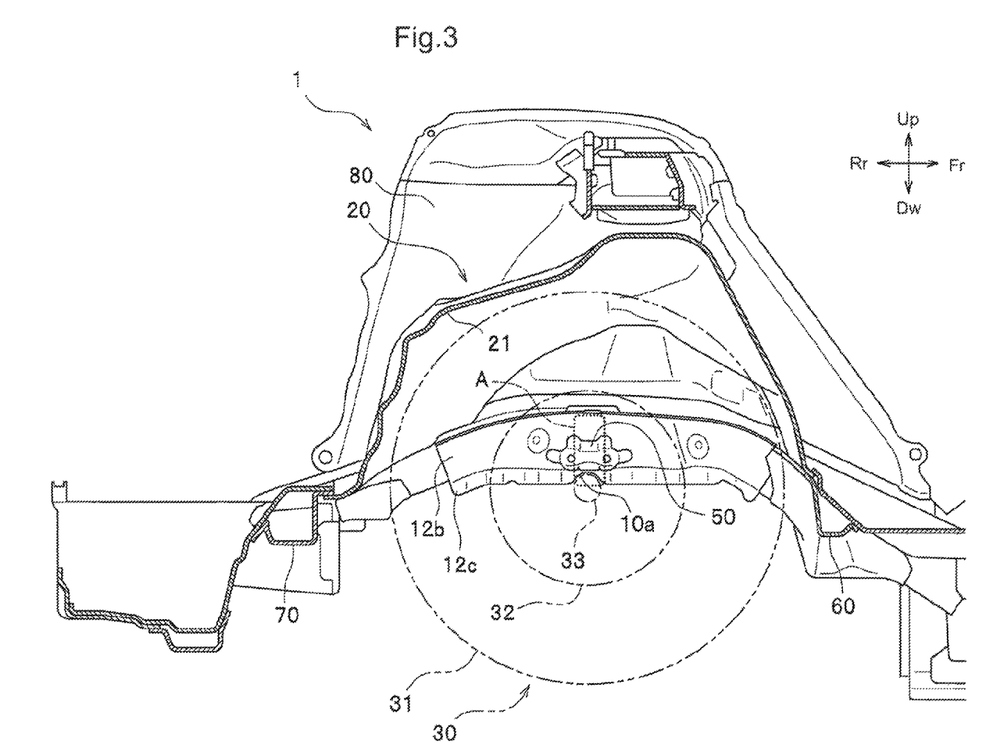
FIG. 3 is a sectional view seen in the direction of the arrow III-III of FIG. 1.

As illustrated in FIGS. 1 and 3, the floor panel 20 is a metallic member constituting a floor surface of the vehicle 1. The floor panel 20 is hung between the paired left and right side members 10L, 10R. A portion of the floor panel 20 placed inside the left rear wheel (not illustrated) of the vehicle in the vehicle widthwise direction is a tank housing part 21 that is formed to be bent to have an upward protruding shape in a side view so that an upper part of the hydrogen tank 30 can be housed below this portion.

<Hydrogen Tank>

The hydrogen tank 30 is installed below the floor panel 20, and is a fuel tank capable of storing hydrogen as a fuel and feeding the stored hydrogen to a fuel cell (not illustrated). The hydrogen tank 30 includes: a tank body 31; a tank, cover 32; and the valve member 33. Note that, in FIG. 3, the tank body 31, the tank cover 32, and the valve member 33 of the hydrogen tank 30 are illustrated in a simplified form with a chain double-dashed line, and the support member 40L is omitted.

<Tank Body>

The tank body 31 is a metallic or resin-made tank having a hollow shape and having a circular shape in the side view. An upper part of the tank body 31 is housed in the tank housing part 21. The tank body 31 can store high-pressure hydrogen therein. An opening in which an in-tank module to be described later is mounted and hydrogen is circulated is formed in one side face (left side face) of the tank body 31 in the vehicle widthwise direction.

<Tank Cover>

Figure 4:
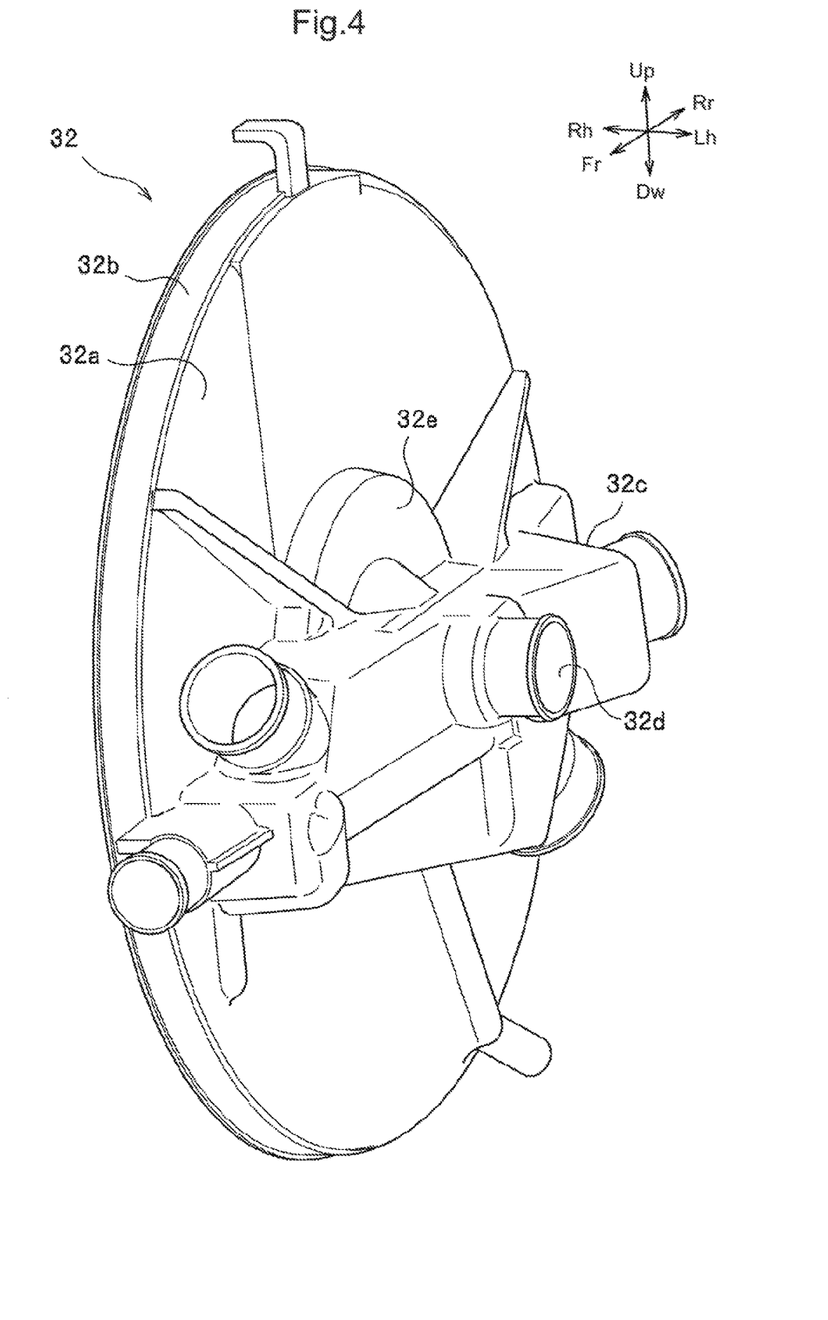
FIG. 4 is a perspective view illustrating a tank cover.

The tank cover 32 is a resin-made member that is mounted on one side face of the tank body 31 in the vehicle widthwise direction. As illustrated in FIG. 4, the tank cover 32 integrally includes: a general surface part 32a that has a disc shape; an annular flange part 32b that extends inward in the vehicle widthwise direction from a marginal part of the general surface part 32a; and a module housing part 32c that extends in the longitudinal direction and projects outward in the vehicle widthwise direction in an intermediate part of the general surface part 32a in the vertical direction. The in-tank module (not illustrated) including a regulator, a valve, a sensor, and the like is installed inside the module housing part 32c.

In addition, the tank cover 32 includes, integrally with the general surface part 32a: a valve mount cylindrical part 32d that projects outward in the vehicle widthwise direction in an intermediate part of the module housing part 32c in the longitudinal direction; and a projection part 32e that projects outward in the vehicle widthwise direction from the general surface part 32a at a position adjacent to and above the module housing part 32c. The valve member 33 being one of the members constituting the in-tank module is attached to the valve mount cylindrical part 32d. In the side view, the projection part 32e has an arch shape containing a portion that is opposite the convex member 50 in the vehicle widthwise direction. The projection height of the projection part 32e is smaller than the projection height of the module housing part 32c.

Besides the valve mount cylindrical part 32d, the module housing part 32c has cylindrical parts and the like for feeding hydrogen, stored in the tank body 31, to the fuel cell (not illustrated).

<Valve Member>

As illustrated in FIGS. 2 and 3, the valve member 33 is a normally closed valve designed to open/close a hydrogen feed port formed in one side face (left side face) of the tank body 31 in the vehicle widthwise direction. The valve member 33 is fitted in the valve mount cylindrical part 32d, and a tip part of the valve member 33 is located outside a tip part of the valve mount cylindrical part 32d in the vehicle widthwise direction. Hydrogen from the outside is fed to and stored in the tank body 31 via the valve member 33 of the in-tank module, and the hydrogen thus stored in the tank body 31 is fed to the fuel cell via the in-tank module.

<Support Member>

As illustrated in FIG. 1, the support members 40L, 40R are metallic belts designed to support the tank body 31 of the hydrogen tank 30 from below. The support members 40L, 40R extend in the longitudinal direction, and are formed to be bent to have a downward protruding shape in the side view so that they extend along the shape of the tank body 31. The support members 40L, 40R are hung on a bottom face of the floor panel 20 so as to straddle the tank housing part 21. Specifically, in an area ahead of the tank housing part 21 of the floor panel 20 and on a lower face side of the floor panel 20, front end parts of the support members 40L, 40R are each fixed, with bolts and the like, on a front cross member 60 that is hung between the paired left and right side members 10L, 10R; in addition, in an area behind the tank housing part 21 of the floor panel 20 and on the lower face side of the floor panel 20, rear end parts of the support members 40L, 40R are each fixed, with bolts and the like, on a rear cross member 70 that is hung between the paired left and right side members 10L, 10R.

<Convex Member>

As illustrated in FIG. 2, the side member 10L located on the valve member 33 side has a convex part that projects inward in the vehicle widthwise direction from a vehicle-widthwise inner side face of the side member 10L, i.e., the inner wall part 12b. In this embodiment, this convex part is constituted of the convex member 50.

Figure 5A:
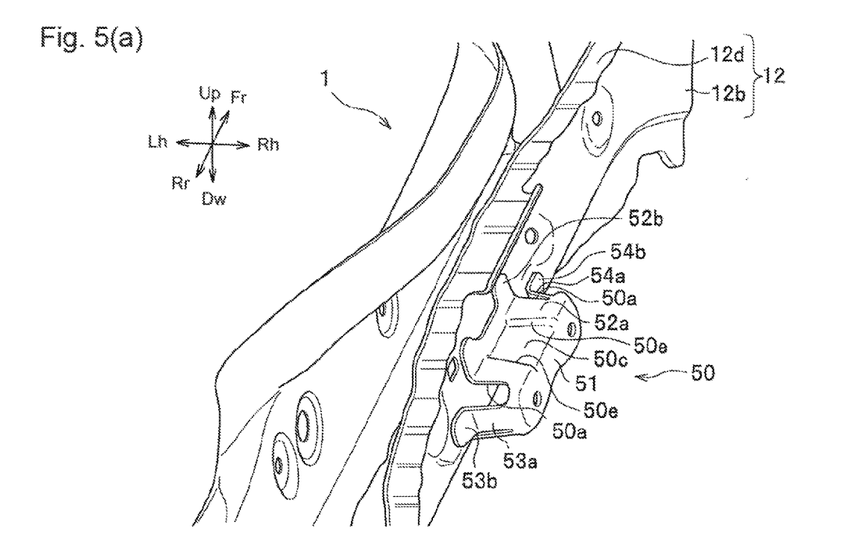
FIG. 5(a) is a view of the convex member seen from obliquely above.
Figure 5B:
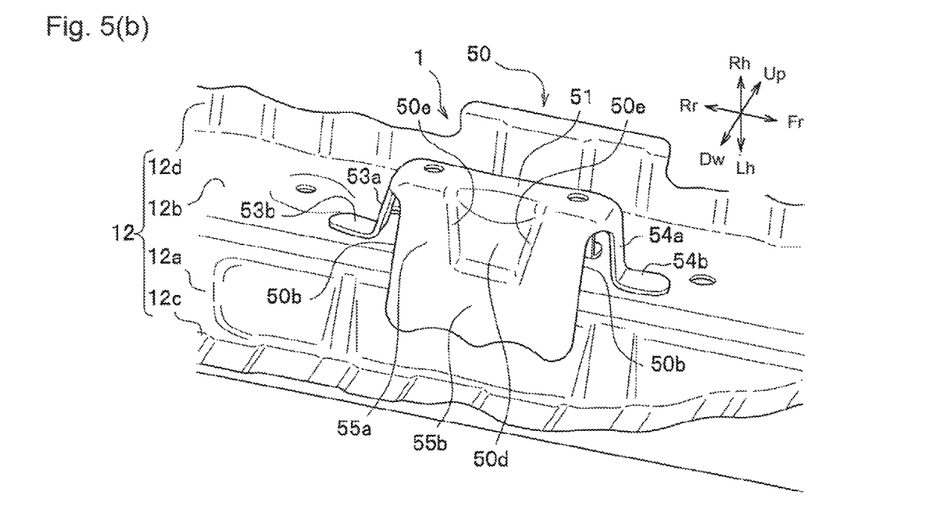
FIG. 5(b) is a view of the convex member seen from obliquely below.

The convex member (also called a bracket) 50 is a metallic member attached to the side member 10L for constituting the convex part described above. As illustrated in FIGS. 5(a) and 5(b), the convex member 50 integrally includes: a sidewall part 51 that constitutes a tip part of the convex member 50; an upper wall part 52a that extends outward in the vehicle widthwise direction from an upper end part of the sidewall part 51; a flange part 52b that extends upward from a vehicle-widthwise outer end part of the upper wall part 52a; a front wall part 53a that extends outward in the vehicle widthwise direction from a front end part of the sidewall part 51; and a flange part 53b that extends forward from a vehicle-widthwise outer end part of the front wall part 53a. The convex member 50 also includes, integrally with the sidewall part 51: a rear wall part 54a that extends outward in the vehicle widthwise direction from a rear end part of the sidewall part 51; a flange part 54b that extends rearward from a vehicle-widthwise outer end part of the rear wall part 54a; a lower wall part 55a that extends outward in the vehicle widthwise direction from a lower end part of the sidewall part 51; and a flange part 55b that extends further outward in the vehicle widthwise direction from a vehicle-widthwise outer end part of the lower wall part 55a.

The flange parts 52b, 53b, 54b are joined to the inner wall part 12b of the side member 10L by welding or the like. The flange part 55b is joined to the lower wall part 12a of the side member 10L by welding or the like.

The upper wall part 52a is separated away from the front wall part 53a and from the rear wall part 54a, and the spaces between them form slits 50a, 50a that extend in the vehicle widthwise direction and are open on the outer side thereof in the vehicle widthwise direction. Besides, the lower wall part 55a is separated away from the front, wall part 53a and from the rear wall part 54a, and the spaces between them form slits 50b, 50b that extend in the vehicle widthwise direction and are open on the outer side thereof in the vehicle widthwise direction. Here, especially the lower slits 50b, 50b can prevent, electrodeposition coating material from being accumulated in the space between the inner wall part 12b and the convex member 50 of the side member 10L.

A concave part 50c that extends in the vehicle widthwise direction and dents downward is formed in an intermediate part of the upper wall part 52a in the longitudinal direction with respect to the vehicle. A concave part 50d that extends in the vehicle widthwise direction and dents upward is formed in an intermediate part of the lower wall part 55a in the longitudinal direction with respect to the vehicle. Front and rear end parts of each of these concave parts 50c, 50d each form a bead part 50e that extends in the vehicle widthwise direction, and these bead parts 50e enhance the strength of the upper wall part 52a and the lower wall part 55a against side collision.

<Positional Relationship Among Projection Part, Valve Member, Convex. Member, etc.>

As illustrated in FIGS. 2 and 3, the convex member 50 is offset with respect to the valve member 33 and placed at a position opposite a vehicle-widthwise end part of the fuel tank 30 in the vehicle widthwise direction. In this embodiment, portions other than the flange parts 11d, 12c of the side member 10L are offset upward with respect to the valve member 33, and a vehicle-widthwise inner end part of the side member 10L (inner wall part 12b) is located above the valve member 33.

The sidewall part 51 being the tip part (vehicle-widthwise inner end part) of the convex member 50 that projects inward in the vehicle widthwise direction from the inner wall part 12b of the side member 10L is opposed to the projection part 32e of the tank cover 32 in the vehicle widthwise direction. The tip part (vehicle-widthwise outer end part) of the valve member 33 is opposed to the flange parts 11d, 12c of the side member 10L in the vehicle widthwise direction. In this embodiment, the valve member 33 and the flange parts 11d, 12c are actually not opposed to each other because the notch part 10a is formed in the flange parts 11d, 12c; however, the assumption is made here that no notch part 10a is formed.

A distance L1 between the sidewall part 51 of the convex member 50 and the portion of the hydrogen tank 30 opposite the sidewall part 51 in the vehicle widthwise direction, i.e., the projection, part 32e of the tank cover 32 is shorter than a distance L2 (L1<L2) between the tip part of the valve member 33 and the portion of the flange parts 11d, 12c opposite the tip part of the valve member 33 in the vehicle widthwise direction. Accordingly, in the case where a side collision occurs at the left side face of the vehicle (Arrow X in FIG. 1), the sidewall part 51 of the convex member 50 hits the projection part 32e of the tank cover 32 first (earlier than the side member 10L hitting the valve member 33), thus making it possible to prevent an excessive load from being applied on the valve member 33 and thereby protect the valve member 33.

In the valve protection structure for a vehicle 1 according to the embodiment of the present disclosure, since the side member 10L has the convex part (that is, the convex member 50), a valve installed on the vehicle-widthwise side face of the fuel tank can be protected in the event of a side collision of the vehicle.

In addition, in the valve protection structure for a vehicle 1, the convex part is constituted of the convex member 50 which is a member different from the side member 10L, and the flange part 55b extending from the lower wall part 55a of the convex member 50 is joined to the lower wall part 12a of the side member 10L. This makes it possible to enhance the strength of the convex part and thereby protect the valve member 33 against side collision more favorably.

Moreover, in the valve protection structure for a vehicle 1, the convex part (that is, the convex member 50) has the slits 50a, 50b. Thus, the convex part is likely to crash in the direction toward the vehicle when an excessive load is applied on the convex part, enabling absorption of energy caused by a side collision.

Further, in the valve protection structure for a vehicle 1, the tank cover 32 has the projection part 32e, projecting from the general surface part 32a of the tank cover 32, at a position opposite the convex part (that is, the convex member 50) in the vehicle widthwise direction. Thereby, it is possible to set the distance L1 between the convex part (that is, the convex member 50) and the hydrogen tank 30 suitably by means of the projection height, of the projection part 32e.

The embodiment of the present disclosure has been described above. However, the present invention is not limited to what is described in the above embodiment, and design changes may be made as appropriate without departing from the gist of the present invention. For example, a portion A (see FIG. 3) of the side member 10L on the valve member 33 side, which is located at the same position as the valve member 33 in the longitudinal direction with respect to the vehicle, may be configured such that it is offset upward with respect to the valve member 33 and not opposed to the valve member 33 in the vehicle widthwise direction.

In addition, the convex part of the side member 10L is not limited to one constituted of the convex member 50 described above, and may be configured such that it is formed integrally with the inner wall part 12b by subjecting the side member inner 12 of the side member 10L to bend machining.

Moreover, the installation position of the hydrogen tank 30 is not limited to the above, and the present invention is applicable to a configuration where the hydrogen tank 30 is installed at a position between front and rear wheels in the longitudinal direction with respect to the vehicle.

Further, the present invention is applicable to vehicles having a fuel tank other than the hydrogen tank 30.

Furthermore, in addition to the valve that is placed at the feed path (feed port) through which fuel is fed to the fuel tank from the outside and that is designed to open/close the feed path, the present invention is applicable to various valves installed on the side face of the fuel tank, such as a valve that is placed at an outlet path (outlet port) through which fuel stored in the fuel tank is discharged to a fuel cell, an internal combustion engine, and the like and that is designed to open/close the outlet path. Although a specific form of embodiment has been described above and illustrated in the accompanying drawings in order to be more clearly understood, the above description is made by way of example and not as limiting the scope of the invention defined by the accompanying claims. The scope of the invention is to be determined by the accompanying claims. Various modifications apparent to one of ordinary skill in the art could be made without departing from the scope of the invention. The accompanying claims cover such modifications.

We claim:

1. A valve protection structure for a vehicle comprising:
a pair of left and right side members which extend in a longitudinal direction of a vehicle body;
a fuel tank which is disposed between said left and right side members; and
a valve which is installed to project outward in a vehicle widthwise direction from a vehicle-widthwise end face of said fuel tank, the vehicle-widthwise end face of said fuel tank facing one of the left and right side members, wherein
the one of said left and right side members includes a convex part that projects inward in the vehicle widthwise direction from a vehicle-widthwise inner side face of the one of the side members,
said convex part is disposed opposite to said vehicle-widthwise end face of said fuel tank in the vehicle widthwise direction and disposed at a position offset with respect to said valve, and
a vehicle-widthwise distance between a tip part of said convex part and a portion of said fuel tank opposite to said tip part of said convex part in the vehicle widthwise direction is set shorter than a vehicle-widthwise distance between a tip part of said valve and a portion of the one of the side members opposite to said tip part of said valve in the vehicle widthwise direction.

2. The valve protection structure according to claim 1, wherein
said convex part is constituted of a convex member attached to the one of the side members, and
a lower part of said convex member extends to a bottom face of the one of the side members and is attached to said bottom face.

3. The valve protection structure according to claim 1, wherein said convex part includes a slit extending in the vehicle widthwise direction.

4. The valve protection structure according to claim 1, wherein
said fuel tank includes:
a fuel tank body which is capable of storing fuel therein; and
a tank cover which is installed on a vehicle-widthwise end part of said fuel tank body and on which said valve is mounted, and
said tank cover has a projection part that projects outward in the vehicle widthwise direction from a vehicle-widthwise end face of said tank cover, the projection part being disposed at a position opposite to said convex part in the vehicle widthwise direction.

5. A vehicle comprising the valve protection structure according to claim 1.

6. The valve protection structure according to claim 1, wherein said convex part is disposed at a position offset with respect to said valve in a direction orthogonal to an axial direction of the valve.

7. The valve protection structure according to claim 1, wherein the one of the side members includes a notch part at a position opposite to the valve in the vehicle widthwise direction, the notch part having a shape corresponding to an outer shape of the valve.

8. The valve protection structure according to claim 1, wherein said convex part is disposed at a position offset upward with respect to said valve.

9. A valve protection structure for a vehicle comprising:
a pair of left and right side members which extend in a longitudinal direction of a vehicle body;
a fuel tank which is disposed between said left and right side members; and
a valve which is installed to project outward in a vehicle widthwise direction from a vehicle-widthwise end face of said fuel tank, the vehicle-widthwise end face of said fuel tank facing one of the left and right side members, wherein
the one of said left and right side members includes a convex part that projects inward in the vehicle widthwise direction from a vehicle-widthwise inner side face of the one of the side members,
said convex part is disposed opposite to said vehicle-widthwise end face of said fuel tank in the vehicle widthwise direction and disposed at a position offset with respect to said valve, and
a portion of the one of the side members, which is located at a same position as said valve in the longitudinal direction with respect to the vehicle, is offset upward with respect to said valve.

10. The valve protection structure according to claim 9, wherein said convex part is disposed at the position offset with respect to said valve in a direction orthogonal to an axial direction of the valve.

11. The valve protection structure according to claim 9, wherein said convex part is disposed at a position offset and upwardly located with respect to said valve.

12. The valve protection structure according to claim 9, wherein a vehicle-widthwise distance between a vehicle-widthwise inner end of said convex part and a portion of said fuel tank opposite to said inner end of said convex part in the vehicle widthwise direction is set shorter than a vehicle-widthwise distance between a vehicle-widthwise outer end of said valve and a portion of the one of the side members opposite to said outer end of said valve in the vehicle widthwise direction.

* * * * *